Patented July 16, 1929.

1,720,752

UNITED STATES PATENT OFFICE.

ROGER ADAMS AND WENDELL WILLIAM MOYER, OF URBANA, ILLINOIS, ASSIGNORS TO THE NEWPORT COMPANY, OF CARROLLVILLE, WISCONSIN, A CORPORATION OF DELAWARE.

3'-AMINO-4'-ACIDYLAMIDO-O-BENZOYL-BENZOIC ACIDS AND PROCESS OF MAKING THE SAME.

No Drawing. Application filed July 9, 1927, Serial No. 204,656. Renewed May 18, 1929.

This invention relates to 3'-amino-4'-acidylamido-o-benzoyl-benzoic acids and to a process of making the same.

It is an object of this invention to provide a simple, efficient and economical process for preparing 3'-amino-4'-acidylamido-o-benzoyl-benzoic acids, which constitute intermediates for the preparation of valuable dyestuffs.

Other and further important objects of this invention will become apparent from the disclosures in the following description and appended claims.

We have discovered that under certain conditions the 3'-nitro-4'-acidylamido-o-benzoyl-benzoic acids described in our co-pending application Serial No. 204,655, filed July 2, 1927, can be reduced to the corresponding 3'-amino-4'-acidylamido-o-benzoyl-benzoic acids. The reduction presents certain difficulties, probably due to the fact that these bodies are capable of hydrolysis, whereby in place of the original nitro body there results two compounds by fission of the molecule at the nitrogen linkage. However, by accurately controlling the conditions of the reduction, reduction products may be obtained from these nitro bodies in an amount practically equivalent to the theoretical yield.

The general reaction illustrating our process is probably best expressed by the following chemical equations, in which R represents an aryl nucleus, such as phenyl, tolyl and the like, and R' represents an aryl nucleus such as phenyl, naphthyl and the like:

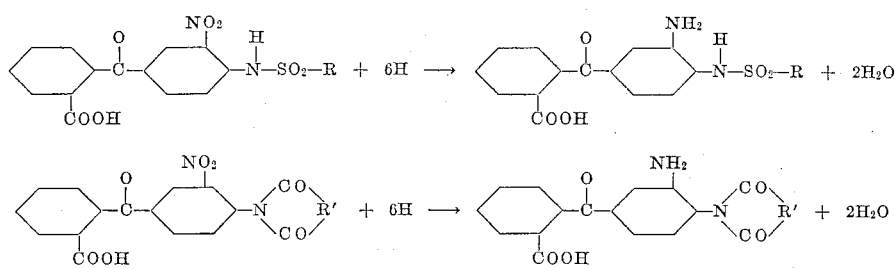

The reduced bodies are in general crystalline solids of high melting point which can be recrystallized from dilute acetic acid. The melting point of 3'-amino-4'-(p-toluene-sulphonamido)-o-benzoyl-benzoic acid after repeated crystallizations from dilute acetic acid was 224° C., that of 3'-amino-4'-benzene-sulphonamido-o-benzoyl-benzoic acid was 204° C.

Without limiting our invention to any particular procedure, the following example, in which parts by weight are given, illustrates the application of our invention in the preferred form:

*Example I.*—3'-amino-4'-(p-toluene-sulphonamido)-o-benzoyl-benzoic acid.

A mixture of 22 parts of 3'-nitro-4'-(p-toluene-sulphonamido)-o-benzoyl-benzoic acid and 80 parts (volume) of alcohol, is treated with about 35 parts of iron powder in a 500 cc. round bottom flask equipped with a mechanical stirrer. To this mixture is added about 15 parts of 6 N. hydrochloric acid, whereby the temperature of the reaction rises rapidly almost to the boiling point of the alcohol. After the reaction has subsided, there is a subsequent amount of 35 parts of iron powder and 15 parts of acid added. The reaction mass is kept near the boil and from time to time more iron and acid are added. In the course of two to three hours the reaction is completed.

The reaction mass is now treated with a 10% solution of caustic soda solution and filtered to separate out the iron. The clear filtrate is cooled and carefully neutralized with dilute hydrochloric acid. The amino compound separates as a precipitate and is filtered off, washed and dried. The yield is practically quantitative.

*Example II.*—3'-amino-4'-benzene-sulphonamido-o-benzoyl-benzoic acid.

The procedure is the same as in Example I except using molecular quantities of 3'-nitro- 4'-benzene-sulphonamido-o-benzoyl-benzoic acid, instead of 3'-nitro-4'-(p-toluene-sulphonamido)-o-benzoyl-benzoic acid.

We are aware that many details of the process may be varied through a wide range without departing from the principles of this invention, and we therefore, do not purpose limiting the patent granted hereon, otherwise than necessitated by the prior art.

We claim as our invention:

1. The method of preparing 3'-amino-4'-acidylamido-o-benzoyl-benzoic acid, which comprises treating the corresponding 3'-nitro-4'-acidylamido-o-benzoyl-benzoic acid in alcohol with powdered iron and dilute acid, making alkaline, filtering off the iron sludge and neutralizing the filtrate with acid to precipitate out the product.

2. As new articles of manufacture, 3'-amino-4'-acidylamido-o-benzoyl-benzoic acids.

3. As a new article of manufacture, 3'-amino-4'-(p-toluene-sulphonamido)-o-benzoyl-benzoic acid.

4. As new articles of manufacture, 3'-amino-4'-acidylamido-o-benzoyl-benzoic acids of the following formula,

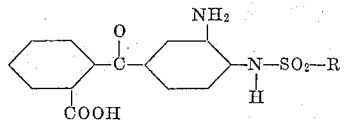

wherein R represents an aryl nucleus.

5. As new articles of manufacture, 3'-amino-4'-acidylamido-ortho benzoyl benzoic acids of the following formula:

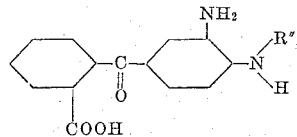

in which R'' is an acidyl group.

In testimony whereof we have hereunto subscribed our names at Urbana, Champaign County, Illinois.

ROGER ADAMS.
WENDELL WILLIAM MOYER.